(12) United States Patent
Miyazaki

(10) Patent No.: US 9,796,826 B2
(45) Date of Patent: *Oct. 24, 2017

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventor: Tatsuya Miyazaki, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/782,165

(22) PCT Filed: Mar. 13, 2014

(86) PCT No.: PCT/JP2014/056627
§ 371 (c)(1),
(2) Date: Oct. 2, 2015

(87) PCT Pub. No.: WO2014/178232
PCT Pub. Date: Nov. 6, 2014

(65) Prior Publication Data
US 2016/0046781 A1  Feb. 18, 2016

(30) Foreign Application Priority Data

Apr. 30, 2013 (JP) ................. 2013-095532

(51) Int. Cl.
| C08K 3/18 | (2006.01) |
| C08K 3/22 | (2006.01) |
| B60C 1/00 | (2006.01) |
| C08L 21/00 | (2006.01) |

(52) U.S. Cl.
CPC ............. C08K 3/22 (2013.01); B60C 1/00 (2013.01); B60C 1/0016 (2013.01); C08L 21/00 (2013.01); C08K 2003/2227 (2013.01); C08K 2003/2244 (2013.01)

(58) Field of Classification Search
CPC ................ C08K 3/22; C08K 2003/2227
USPC ................................... 524/430
See application file for complete search history.

(56) References Cited

U.S. PATENT DOCUMENTS

| 6,130,283 | A * | 10/2000 | Nippa ................ C01F 7/02 |
| | | | 152/905 |
| 6,186,204 | B1 * | 2/2001 | Sasaka ............... B60C 1/0016 |
| | | | 152/209.5 |
| 6,656,992 | B2 * | 12/2003 | Ezawa ................ B60C 1/0016 |
| | | | 524/437 |
| 2001/0023271 | A1 | 9/2001 | Kikuchi et al. |
| 2002/0004549 | A1 | 1/2002 | Custodero et al. |
| 2002/0026003 | A1 * | 2/2002 | Tahara ............... B60C 1/0016 |
| | | | 524/494 |
| 2003/0149161 | A1 | 8/2003 | Ezawa et al. |
| 2004/0030027 | A1 | 2/2004 | Konno et al. |
| 2008/0097021 | A1 | 4/2008 | Krueger |
| 2009/0203828 | A1 * | 8/2009 | Kurazumi ........... B60C 1/0025 |
| | | | 524/495 |

FOREIGN PATENT DOCUMENTS

| CN | 1440883 A | 9/2003 |
| JP | 2000178379 A * | 6/2000 |
| JP | 2000-204197 A | 7/2000 |
| JP | 2000-256506 A | 9/2000 |
| JP | 2001-72802 A | 3/2001 |
| JP | 2001-180929 A | 7/2001 |
| JP | 2002-30183 A | 1/2002 |
| JP | 2002-80642 A | 3/2002 |
| JP | 2002-97303 A | 4/2002 |
| JP | 2003-501503 A | 1/2003 |
| JP | 2003-165871 A | 6/2003 |
| JP | 2008-528739 A | 7/2008 |
| JP | 4559573 B2 | 10/2010 |

OTHER PUBLICATIONS

Translation of JP 2000178379, Jun. 27, 2000.*
Aluminum hydroxide, CreationWiki, the encyclopedia of creation science, 2016.*
JP-2000-256506-A, dated Sep. 19, 2000, with a machine translation.
JP-2001-72802-A, dated Mar. 21, 2001, with a machine translation.
JP-2002-80642-A, dated Mar. 19, 2002, with a machine translation.
JP-2002-97303-A, dated Apr. 2, 2002, with a machine translation.
JP-2003-165871-A, dated Jun. 10, 2003, with a machine translation.
International Search Report issued in PCT/JP2014/056627 dated Jun. 24, 2014.

* cited by examiner

Primary Examiner — Hui Chin
(74) Attorney, Agent, or Firm — Birch, Stewart, Kolasch & Birch, LLP

(57) ABSTRACT

A rubber composition that achieves a balanced improvement in wet grip performance, abrasion resistance, and roll processability, and a pneumatic tire formed from the rubber composition. The rubber composition includes, per 100 parts by mass of a rubber component, 1-60 parts by mass of an inorganic reinforcing agent having an average particle size of 0.69 μm or less and a nitrogen adsorption specific surface area of 10-50 m²/g, the inorganic reinforcing agent being represented by the following formula: $kM_1 \cdot xSiO_y \cdot zH_2O$ wherein $M_1$ represents at least one metal selected from the group consisting of Al, Mg, Ti, Ca, and Zr, or an oxide or hydroxide of the metal; k represents an integer of 1 to 5; x represents an integer of 0 to 10; y represents an integer of 2 to 5; and z represents an integer of 0 to 10.

8 Claims, 1 Drawing Sheet

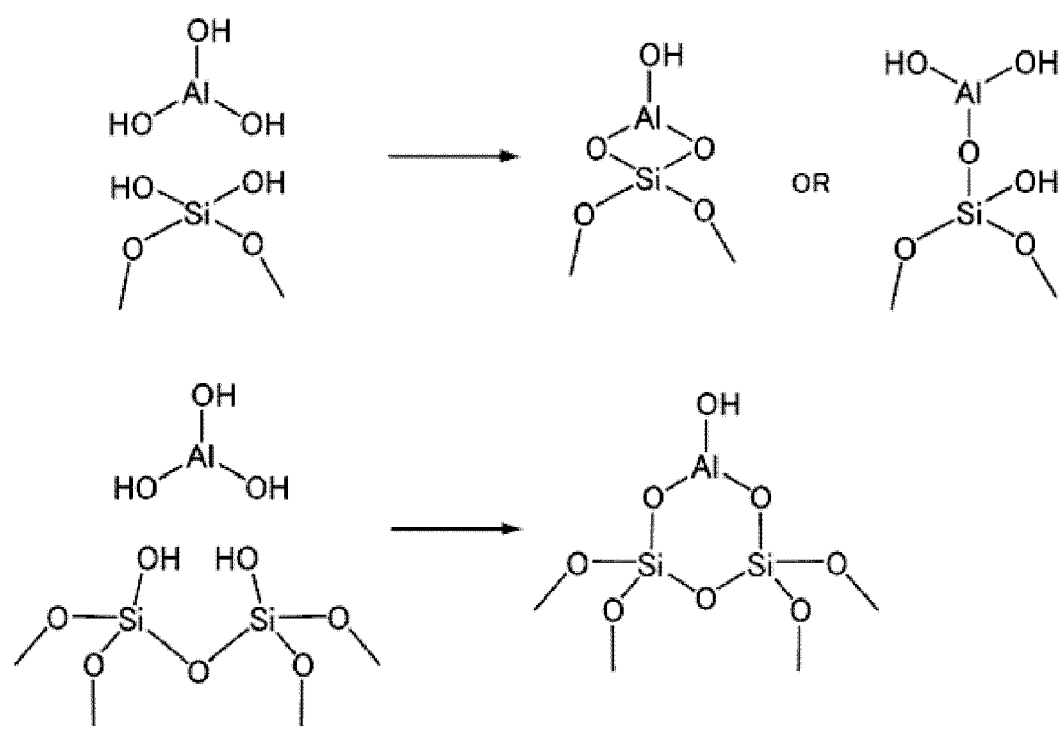

TIRE RUBBER COMPOSITION AND PNEUMATIC TIRE

TECHNICAL FIELD

The present invention relates to a rubber composition for tires, and a pneumatic tire that includes a tread formed from the rubber composition.

BACKGROUND ART

Pneumatic tires consist of various components including a tread, a sidewall and the like. These components are provided with various appropriate properties. The tread which makes contact with the road surface needs to have wet grip performance and the like for safety and other reasons. A method has been proposed which improves these properties by addition of aluminum hydroxide. Unfortunately, this method deteriorates abrasion resistance and is thus rarely employed in the production of tires for general public roads. This method also has a problem in the processability of compounding materials.

Other methods are, for example, a method of increasing the styrene content or the vinyl content in solution-polymerized styrene-butadiene rubber, a method of using modified solution-polymerized styrene-butadiene rubber to control the tan δ curve, a method of increasing the amount of silica to provide a higher tan δ peak, a method of adding a liquid resin, and the like. At present, it is still difficult to improve wet grip performance while maintaining other physical properties.

Patent Literature 1 discloses the use of a specific rubber component and a specific inorganic reinforcing agent such as aluminum hydroxide to enhance wet grip performance, abrasion resistance, and processability. However, there is a need for further improvements.

CITATION LIST

Patent Literature

Patent Literature 1: JP 4559573 B

SUMMARY OF INVENTION

Technical Problem

The present invention aims to solve the above problems and provide a rubber composition for tires that achieves a balanced improvement in wet grip performance, abrasion resistance, and roll processability, and a pneumatic tire formed from the rubber composition.

Solution to Problem

One aspect of the present invention is a rubber composition for tires, containing, per 100 parts by mass of a rubber component, 1 to 60 parts by mass of an inorganic reinforcing agent having an average particle size of 0.69 or less and a nitrogen adsorption specific surface area of 10 to 50 m$^2$/g, the inorganic reinforcing agent being represented by the following formula:

$$kM_1 \cdot xSiO_y \cdot zH_2O$$

wherein $M_1$ represents at least one metal selected from the group consisting of Al, Mg, Ti, Ca, and Zr, or an oxide or hydroxide of the metal; k represents an integer of 1 to 5; x represents an integer of 0 to 10; y represents an integer of 2 to 5; and z represents an integer of 0 to 10.

Preferably, the inorganic reinforcing agent has a Mohs hardness of less than 7, and a thermal decomposition product of the inorganic reinforcing agent has a Mohs hardness of 8 or more.

The inorganic reinforcing agent preferably has a solubility in pure water at 25° C. of 5 mg/100 cm$^3$ or less.

Preferably, the rubber composition contains a diene rubber in an amount of 30% by mass or more based on 100% by mass of the rubber component, and the inorganic reinforcing agent is aluminum hydroxide.

The rubber composition preferably contains styrene-butadiene rubber in an amount of 10% by mass or more based on 100% by mass of the rubber component.

Another aspect of the present invention is a pneumatic tire, including a tread formed from the rubber composition for tires.

Advantageous Effects of Invention

The rubber composition for tires according to the present invention contains an inorganic reinforcing agent in a predetermined amount relative to the rubber component. The inorganic reinforcing agent is represented by a specific formula and has a specific average particle size and a certain adsorption specific surface area. Such a rubber composition achieves a balanced improvement in wet grip performance, abrasion resistance, and roll processability.

BRIEF DESCRIPTION OF DRAWINGS

FIG. 1 is a schematic view showing an instantaneous reaction between aluminum hydroxide on the tire surface and silica on the road surface, or bonding of silica and aluminum hydroxide during kneading.

DESCRIPTION OF EMBODIMENTS

The rubber composition for tires of the present invention contains, per 100 parts by mass of the rubber component, a predetermined amount of an inorganic reinforcing agent that is represented by a specific formula and has a specific average particle size and a certain nitrogen adsorption specific surface area.

In the Description, the amounts of chemicals such as the inorganic reinforcing agent in the rubber composition for tires each refer to the amount compounded (or added) into the uncured rubber composition. In other words, the amounts of chemicals in the rubber composition for tires mean the theoretical amounts of chemicals in the unvulcanized rubber composition for tires. The "theoretical amount" refers to the amount of a chemical introduced in the preparation of the unvulcanized rubber composition.

Wet grip performance can be improved by adding the inorganic reinforcing agent, such as aluminum hydroxide, having a specific average particle size and a certain nitrogen adsorption specific surface area. This effect is presumably produced by the following effects (1) to (3).

(1) During kneading, the added inorganic reinforcing agent such as aluminum hydroxide (Al(OH)$_3$) is partially converted to alumina (Al$_2$O$_3$) having a Mohs hardness equal to or higher than that of silica, or the inorganic reinforcing agent such as aluminum hydroxide binds to silica (through covalent bonding or dehydration) and is immobilized by the finely-dispersed silica chains in the rubber composition.

Such metal oxide aggregates or inorganic reinforcing agent is considered to provide an anchoring effect, thereby enhancing wet grip performance.

(2) As a result of the contact (friction) between silicon dioxide on the road surface and the inorganic reinforcing agent, such as aluminum hydroxide, on the tire surface during running, covalent bonds are considered to be instantaneously formed as shown in FIG. 1, enhancing wet grip performance.

(3) A part of the surface of tires on wet roads makes contact with the road surface through a water film. Usually, such a water film is considered to be evaporated by the friction heat generated at sites where the tire makes direct contact with the road surface. When aluminum hydroxide, for example, is incorporated, the friction heat is considered to contribute to the progress of an endothermic reaction of aluminum hydroxide on the tire surface as shown by "Al$(OH)_3 \rightarrow 1/2\ Al_2O_3 + 3/2\ H_2O$", thereby resulting in reduced evaporation of the water film (moisture). If the water film is evaporated, a void space is formed between the tire surface and the road surface and thus the contact area between the road surface and the tire is reduced, resulting in a decrease in wet grip performance.

Thus, wet grip performance is improved by the effects of the addition of a conventional inorganic reinforcing agent such as aluminum hydroxide. However, the addition usually deteriorates abrasion resistance and roll processability. Hence, it is difficult to achieve a balanced improvement in the properties. In the present invention, since an inorganic reinforcing agent, such as aluminum hydroxide, having a specific average particle size and a certain nitrogen adsorption specific surface area is added, wet grip performance is improved while reducing the deterioration of abrasion resistance and roll processability and maintaining the properties well. Thus, a balanced improvement in the properties is achieved. Further, if rare earth-catalyzed polybutadiene rubber is used in the rubber component, then abrasion resistance is markedly improved, resulting in a further improvement of the balance of the properties.

The rubber component in the present invention is not particularly limited, and examples include isoprene-based rubbers such as natural rubber (NR) or polyisoprene rubber (IR), and diene rubbers such as polybutadiene rubber (BR), styrene-butadiene rubber (SBR), styrene-isoprene-butadiene rubber (SIBR), chloroprene rubber (CR), or acrylonitrile butadiene rubber (NBR). Among these, isoprene-based rubbers, BR, and SBR are preferred as they provide good durability while ensuring good handling stability, good fuel economy, and good elongation at break. Particularly for summer tires, BR and SBR are preferably used in combination. For studless winter tires for which performance on ice is also important, BR and an isoprene-based rubber are preferably used in combination.

Any kind of BR may be used, and examples include those commonly used in the tire industry, such as high-cis BR, 1,2-syndiotactic polybutadiene crystal (SPB)-containing BR, or BR synthesized with a rare earth catalyst (rare earth-catalyzed BR). Rare earth-catalyzed BR is preferred among these as it provides good durability while ensuring good handling stability, good fuel economy, and good elongation at break.

Conventional rare earth-catalyzed BR may be used, and examples include those synthesized with rare earth catalysts (catalysts containing a lanthanide rare earth compound, an organic aluminum compound, an aluminoxane, or a halogen-containing compound, optionally with a Lewis base) and the like. In particular, Nd-catalyzed BR, which is synthesized with a neodymium catalyst, is preferred.

The NR as an isoprene-based rubber may be one commonly used in the tire industry, such as SIR20, RSS#3, or TSR20. The IR may also be one commonly used in the tire industry, such as IR 2200. Any kind of SBR may be used, and examples include emulsion-polymerized SBR (E-SBR), solution-polymerized SBR (S-SBR), and modified SBR for silica prepared by modification with a compound interactive with silica. Modified SBR for silica is preferred among these as it strongly interacts with silica and thereby allows silica to be well dispersed so that fuel economy and abrasion resistance can be improved.

The modified SBR for silica may be a conventional one, such as SBR having a polymer chain end or polymer backbone modified with any of various modifiers. Examples include modified SBRs described in, for example, JP 2010-077412 A, JP 2006-274010 A, JP 2009-227858 A, JP 2006-306962 A, and JP 2009-275178 A. Specifically, suitable is modified SBR having a Mw of $1.0 \times 10^5$ to $2.5 \times 10^6$, obtained by reaction with a modifier represented by the following Formula (1):

(1)

wherein n represents an integer of 1 to 10; R represents a divalent hydrocarbon group such as —$CH_2$—; $R^1$, $R^2$, and $R^3$ each independently represent a C1-C4 hydrocarbyl group or a C1-C4 hydrocarbyloxy group, and at least one of $R^1$, $R^2$, or $R^3$ is the hydrocarbyloxy group; and A represents a functional group containing a nitrogen atom.

In the present invention, the modified SBR for silica preferably has a bound styrene content of 25% by mass or more, more preferably 27% by mass or more. At a bound styrene content of less than 25% by mass, wet grip performance tends to be poor. Also, the bound styrene content is preferably 50% by mass or less, more preferably 45% by mass or less, and still more preferably 40% by mass or less. At a bound styrene content of more than 50% by mass, fuel economy may be deteriorated.

The styrene content is determined by $H^1$-NMR.

From the standpoint of achieving the effect of the present invention well, the rubber composition of the present invention preferably contains a diene rubber in an amount of 30% by mass or more, more preferably 70% by mass or more, still more preferably 80% by mass or more, or even 100% by mass, based on 100% by mass of the rubber component.

Particularly in the case of the rubber composition for summer tires containing BR, the amount of BR based on 100% by mass of the rubber component is preferably 10% by mass or more, and more preferably 20% by mass or more. The amount of BR is preferably 80% by mass or less, more preferably 75% by mass or less, and still more preferably 70% by mass or less. If the amount is more than 80% by mass, chipping resistance and wet grip performance may be poor. In order to achieve high dry grip performance, the composition should be an SBR/NR compound and may not contain BR.

In the case of the rubber composition for summer tires, the rubber composition preferably contains SBR in an amount of 10% by mass or more, more preferably 20% by mass or more, still more preferably 30% by mass or more, based on 100% by mass of the rubber component. The maximum amount is not particularly limited and may be 100% by mass but is preferably 90% by mass or less. If the amount is less than 10% by mass, grip performance and cure reversion resistance may be poor.

In the case of the rubber composition for studless winter tires, on the other hand, the rubber composition preferably contains BR in an amount of 30% by mass or more, more preferably 40% by mass or more, still more preferably 50% by mass or more, based on 100% by mass of the rubber component. The amount is preferably 90% by mass or less, more preferably 80% by mass or less, and still more preferably 70% by mass or less. If the amount is less than 30% by mass, grip performance at low temperatures (performance on ice, wet grip performance) may be poor. If the amount is more than 90% by mass, dry grip performance and (roll) processability may be poor.

The rubber composition for winter tires preferably contains an isoprene-based rubber in an amount of 10% by mass or more, more preferably 20% by mass or more, still more preferably 30% by mass or more, based on 100% by mass of the rubber component. The amount is preferably 80% by mass or less, more preferably 70% by mass or less, and still more preferably 60% by mass or less. If the amount is less than 10% by mass, dry grip performance and (roll) processability may be deteriorated. If the amount is more than 80% by mass, grip performance at low temperatures (performance on ice, wet grip performance) may be poor.

The rubber composition of the present invention contains an inorganic reinforcing agent that has a specific average particle size and a certain nitrogen adsorption specific surface area and is represented by the following formula:

$$kM_1 \cdot xSiO_y \cdot zH_2O$$

wherein $M_1$ represents at least one metal selected from the group consisting of Al, Mg, Ti, Ca, and Zr, or an oxide or hydroxide of the metal; k represents an integer of 1 to 5; x represents an integer of 0 to 10; y represents an integer of 2 to 5; and z represents an integer of 0 to 10.

Examples of the inorganic reinforcing agent include alumina, alumina hydrate, aluminum hydroxide, magnesium hydroxide, magnesium oxide, talc, titanium white, titanium black, calcium oxide, calcium hydroxide, magnesium aluminum oxide, clay, pyrophyllite, bentonite, aluminum silicate, magnesium silicate, calcium silicate, calcium aluminum silicate, magnesium silicate, zirconium, and zirconium oxide. These inorganic compounds may be used alone, or two or more of these may be used in combination. In particular, inorganic reinforcing agents in which $M_1$ is Al or Zr are preferred, and aluminum hydroxide or zirconium oxide is more preferred, because an oxide layer formed upon contact with air produces a scratching effect to improve wet grip performance and also provides good abrasion resistance. Aluminum hydroxide is particularly preferred as it further provides good kneading productivity and good roll processability.

The inorganic reinforcing agent has an average particle size of 0.69 μm or less, preferably 0.20 to 0.65 μm, more preferably 0.25 to 0.60 μm. At an average particle size of more than 0.69 μm, abrasion resistance and wet grip performance may be reduced. The average particle size of the inorganic reinforcing agent is a number average particle size which is measured with a transmission electron microscope.

The inorganic reinforcing agent has a nitrogen adsorption specific surface area ($N_2SA$) of 10 to 50 m$^2$/g. Such an inorganic reinforcing agent produces a scratching effect and is also inhibited from separation due to wear; therefore, excellent wet grip performance and excellent abrasion resistance can be obtained. The minimum $N_2SA$ is preferably 12 m$^2$/g or more, more preferably 14 m$^2$/g or more, while the maximum $N_2SA$ is preferably 45 m$^2$/g or less, more preferably 40 m$^2$/g or less, still more preferably 29 m$^2$/g or less, and particularly preferably 19 m$^2$/g or less. An inorganic reinforcing agent with a $N_2SA$ of less than 10 m$^2$/g can be easily separated and abrasion resistance tends to be reduced. If the $N_2SA$ is more than 50 m$^2$/g, scratching sites can, upon contact with the road surface, be embedded inside the rubber compound, so that the scratching effect is less likely to be exerted. Additionally, abrasion resistance tends to be reduced due to aggregation (secondary aggregation) of the inorganic reinforcing agent particles. The $N_2SA$ of the inorganic reinforcing agent is determined by the BET method in accordance with ASTM D3037-81.

In order to ensure abrasion resistance and wet grip performance for tires and to reduce metal wear of Banbury mixers or extruders, the inorganic reinforcing agent preferably has a Mohs hardness of 7 like silica, or less than 7, more preferably 2 to 5. Mohs hardness, which is one of mechanical properties of materials, is a measure commonly used through the ages in mineral-related fields. Mohs harness is measured by scratching a material (e.g. aluminum hydroxide) to be analyzed for hardness with a reference material, and determining the presence or absence of scratches.

In particular, it is preferred to use an inorganic reinforcing agent which has a Mohs hardness of less than 7 and whose thermal decomposition product has a Mohs hardness of 8 or more. For example, aluminum hydroxide, which has a Mohs hardness of about 3, prevents abrasion (wear) of Banbury mixers or rolls. In addition, aluminum hydroxide in the upper surface layer undergoes a dehydration reaction (transition) due to vibration or heat build-up during running and partially due to kneading and is converted to alumina having a Mohs hardness of about 9, which is equal to or harder than that of the stones on the road surface. Therefore, excellent abrasion resistance and excellent wet grip performance can be obtained. It should be noted that the internal aluminum hydroxide needs not to be entirely converted, and its partial conversion can provide the effect of scratching the road surface. Furthermore, aluminum hydroxide and alumina are stable to water, bases, and acids, and neither inhibit vulcanization nor promote oxidative degradation. The inorganic reinforcing agent after the transition more preferably has a Mohs hardness of 7 or more, with no upper limitation. Diamond has the highest hardness of 10.

The inorganic reinforcing agent preferably has a thermal decomposition onset temperature (DSC endothermic onset temperature) of 160 to 500° C., more preferably 170 to 400° C. If the temperature is lower than 160° C., thermal decomposition or reaggregation may excessively proceed during kneading, and the metal of the kneader rotor blades, the container wall, or the like may be excessively worn. The thermal decomposition onset temperature of the inorganic reinforcing agent is determined by differential scanning calorimetry (DSC). Moreover, the thermal decomposition includes a dehydration reaction.

The inorganic reinforcing agent preferably has a solubility in pure water at 25° C. of 5 mg/100 cm$^3$ or less in order to provide constant properties in all-weather environments. If the inorganic material is eluted or absorbs moisture, the rubber compound may fail to perform its functions. As used herein, the solubility refers to the amount by mass (g) soluble in 100 g of pure water at 25° C. and can be easily measured.

The inorganic reinforcing agent may be a commercial product that has the above-mentioned average particle size and $N_2SA$ properties, and may also be, for example, an inorganic reinforcing agent having been processed, for example, ground, into particles having the above properties. The grinding may be performed by conventional methods, such as wet grinding or dry grinding using, for example, a jet mill, a current jet mill, a counter jet mill, a contraplex mill, or the like.

If necessary, particles having a specific average particle size and a certain $N_2SA$ may be prepared by fractionation by a membrane filtering method widely employed in medical fields or bio-fields, and then used as a compounding agent for rubber.

The amount of the inorganic reinforcing agent per 100 parts by mass of the rubber component is 1 part by mass or more, preferably 2 parts by mass or more, more preferably 3 parts by mass or more. If the amount is less than 1 part by mass, sufficient wet grip performance may not be obtained. Also, the amount is 60 parts by mass or less, preferably 55 parts by mass or less, and more preferably 50 parts by mass or less. If the amount is more than 60 parts by mass, abrasion resistance may be deteriorated to an extent that cannot be compensated by controlling other compounding agents, and tensile strength and the like may also be deteriorated.

The rubber composition of the present invention may contain carbon black and/or silica in addition to the inorganic reinforcing agent. In particular in view of the balance between wet grip performance and abrasion resistance, the rubber composition preferably contains silica. Examples of the silica include, but not limited to, dry silica (anhydrous silicic acid) and wet silica (hydrous silicic acid). Wet silica is preferred because it has a large number of silanol groups.

The silica preferably has a $N_2SA$ of 40 $m^2/g$ or more, more preferably 80 $m^2/g$ or more, and still more preferably 110 $m^2/g$ or more. Also, the $N_2SA$ is preferably 350 $m^2/g$ or less, and more preferably 250 $m^2/g$ or less. When the $N_2SA$ falls within the range described above, the effect of the present invention can be sufficiently achieved. The $N_2SA$ of silica is determined as mentioned for the inorganic reinforcing agent.

The amount of the silica per 100 parts by mass of the rubber component is preferably 20 parts by mass or more, more preferably 30 parts by mass or more, and still more preferably 40 parts by mass or more. If the amount is less than 20 parts by mass, sufficient abrasion resistance and sufficient wet grip performance may not be obtained. The amount is also preferably 130 parts by mass or less, more preferably 125 parts by mass or less, and still more preferably 120 parts by mass or less. If the amount is more than 130 parts by mass, fuel economy may decrease.

Particularly in the case of the rubber composition for summer tires, the amount of the silica per 100 parts by mass of the rubber component is preferably 30 to 130 parts by mass, and more preferably 35 to 125 parts by mass. In the rubber composition for studless winter tires, on the other hand, the amount of the silica per 100 parts by mass of the rubber component is preferably 20 to 100 parts by mass, and more preferably 25 to 95 parts by mass.

The carbon black preferably has a $N_2SA$ of 40 $m^2/g$ or more, more preferably 60 $m^2/g$ or more, and still more preferably 100 $m^2/g$ or more. Also, the $N_2SA$ is preferably 250 $m^2/g$ or less, and preferably 200 $m^2/g$ or less. When the $N_2SA$ falls within the range described above, the effect of the present invention can be sufficiently achieved.

When carbon black and/or silica is added, their amounts may be appropriately set depending on the properties required for treads, such as wet grip performance or abrasion resistance. The combined amount of these materials is preferably 30 to 180 parts by mass, more preferably 45 to 135 parts by mass, per 100 parts by mass of the rubber component. Particularly in the case of the rubber composition for summer tires, the combined amount is preferably 50 to 160 parts by mass, more preferably 65 to 130 parts by mass, per 100 parts by mass of the rubber component. For use in studless winter tires, on the other hand, the amount of the silica is preferably 35 to 140 parts by mass, more preferably 50 to 110 parts by mass, per 100 parts by mass of the rubber component.

The rubber composition (SBR-containing composition) for summer tires of the present invention may contain a resin as a softener to improve wet grip performance. Examples of the resin include C5 petroleum resins, C9 petroleum resins, terpene-based resins, coumarone indene resins, and aromatic vinyl polymers. Among these, terpene-based resins, coumarone indene resins, aromatic vinyl polymers, and the like are suitable. The rubber composition (isoprene-based rubber-containing composition) for studless winter tires preferably contains a terpene-based resin. Examples of the terpene-based resin include terpene resin, aromatic terpene resin, and terpene phenol resin. Preferred are those having a solubility parameter (SP value) of 8.6 or smaller and a softening point of 106 to 160° C., more preferably 106 to 124° C.

The aromatic vinyl monomer (unit) of the aromatic vinyl polymer may be styrene and/or α-methylstyrene, and the aromatic vinyl polymer may either be a homopolymer of each of the monomers or a copolymer of both monomers. The aromatic vinyl polymer is preferably a homopolymer of α-methylstyrene or styrene, or a copolymer of α-methylstyrene and styrene, and more preferably a copolymer of α-methylstyrene and styrene or a styrene homopolymer, because they are economical, easy to process, and superior in wet skid performance.

The aromatic vinyl polymer preferably has a softening point of 100° C. or lower, more preferably 92° C. or lower, still more preferably 88° C. or lower, but preferably 30° C. or higher, more preferably 60° C. or higher, still more preferably 75° C. or higher. When the aromatic vinyl polymer has a softening point within the range described above, good wet grip performance can be obtained, thereby resulting in an improved balance of the above-mentioned properties. As used herein, softening point is determined as set forth in JIS K 6220 with a ring and ball softening point measuring apparatus and is defined as the temperature at which the ball drops down.

The aromatic vinyl polymer preferably has a weight average molecular weight (Mw) of 400 or more, more preferably 500 or more, still more preferably 800 or more, but preferably 10000 or less, more preferably 3000 or less, still more preferably 2000 or less. When the aromatic vinyl polymer has a Mw within the range described above, the effect of the present invention can be well achieved. As used herein, weight average molecular weight is measured using a gel permeation chromatograph (GPC) and calibrated with polystyrene standards.

The amount of the resin per 100 parts by mass of the rubber component is preferably 2 parts by mass or more, and more preferably 5 parts by mass or more. If the amount is less than 2 parts by mass, such an addition may not be sufficiently effective. The amount is also preferably 50 parts by mass or less, and more preferably 25 parts by mass or less. If the amount is more than 50 parts by mass, abrasion resistance tends to be deteriorated.

The rubber composition of the present invention preferably contains a processing aid. This enhances the dispersibility of filler (especially silica) or a diene rubber gel, thereby enhancing wet grip performance, abrasion resistance, and roll processability.

Examples of the processing aid include fatty acid metal salts, fatty acid amides, amide esters, surfactants for silica, fatty acid esters, mixtures of fatty acid metal salts with amide esters, and mixtures of fatty acid metal salts with fatty acid amides. These may be used alone, or two or more of these may be used in combination. In particular, the processing aid is preferably a fatty acid metal salt, an amide ester, or a mixture of a fatty acid metal salt with an amide ester or with a fatty acid amide, and particularly preferably a mixture of a fatty acid metal salt with a fatty acid amide.

The fatty acid of the fatty acid metal salt is not particularly limited. Examples include saturated or unsaturated fatty acids, preferably C6-C28, more preferably C10-C25, still more preferably C14-C20 saturated or unsaturated fatty acids, such as lauric acid, myristic acid, palmitic acid, stearic acid, oleic acid, linoleic acid, linolenic acid, arachidic acid, behenic acid, or nervonic acid. These may be used alone, or two or more of these may be used in admixture. Among these, saturated fatty acids are preferred, and C14-C20 saturated fatty acids are more preferred.

Examples of the metal of the fatty acid metal salt include alkali metals such as potassium or sodium, alkaline earth metals such as magnesium, calcium, or barium, zinc, nickel, and molybdenum. Among these, zinc or calcium is preferred, and zinc is more preferred.

The fatty acid amide may be either a saturated fatty acid amide or an unsaturated fatty acid amide. Examples of saturated fatty acid amides include N-(1-oxooctadecyl)sarcosine, stearamide, and behenamide. Examples of unsaturated fatty acid amides include oleamide and erucamide.

Specific examples of the mixture of a fatty acid metal salt with a fatty acid amide include WB16 available from STRUKTOL, which is a mixture of a fatty acid calcium salt and a fatty acid amide.

The amount of the processing aid per 100 parts by mass of the rubber component is preferably 0.3 parts by mass or more, and more preferably 0.5 parts by mass or more. If the amount is less than 0.3 parts by mass, such an addition may not be sufficiently effective. The amount is also preferably 15 parts by mass or less, and more preferably 10 parts by mass or less. If the amount is more than 15 parts by mass, abrasion resistance tends to be deteriorated.

The rubber composition of the present invention may appropriately contain, in addition to the above-mentioned components, compounding agents commonly used in the tire industry, such as a silane coupling agent, oil, wax, zinc oxide, an antioxidant, a vulcanizing agent, e.g., sulfur, a vulcanization accelerator, and other materials.

The silane coupling agent may be any of those commonly used in the tire industry, and may be, for example, a silane coupling agent represented by Formula (I) below. If the silane coupling agent represented by Formula (I) is used together with the conjugated diene polymer and silica, then silica is well dispersed, so that wet grip performance and abrasion resistance can be markedly improved. Moreover, since the silane coupling agent represented by Formula (I) is less likely to cause compound scorch, the rubber composition can be discharged at high temperature in the production.

$$(C_pH_{2p+1}O)_3Si\text{—}C_qH_{2q}\text{—}S\text{—}CO\text{—}C_kH_{2k+1} \quad (I)$$

In the formula, p represents an integer of 1 to 3; q represents an integer of 1 to 5; and k represents an integer of 5 to 12.

The symbol p represents an integer of 1 to 3, preferably of 2. If p is 4 or more, the coupling reaction tends to slow down.

The symbol q represents an integer of 1 to 5, preferably of 2 to 4 and more preferably of 3. If q is 0 or 6 or larger, such a silane coupling agent is difficult to synthesize.

The symbol k represents an integer of 5 to 12, preferably of 5 to 10, more preferably of 6 to 8 and still more preferably of 7.

Examples of the silane coupling agent represented by Formula (I) include NXT available from Momentive Performance Materials.

Examples of other silane coupling agents include sulfide silane coupling agents such as bis(3-triethoxysilylpropyl) disulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Sulfide silane coupling agents are preferred among these. Examples of commercial products include NXT-Z45 available from Momentive Performance Material and Si69 and Si75 available from EVONIK-DEGUSSA.

These silane coupling agents may be used alone, or two or more of these may be used in combination.

The rubber composition of the present invention can be prepared by conventional methods, e.g. as follows.

First, components other than sulfur and vulcanization accelerators are compounded (or added) and kneaded in a rubber kneader such as a Banbury mixer or an open roll mill (base kneading step) to obtain a kneaded mixture. Subsequently, sulfur and a vulcanization accelerator are further compounded with (or added to) the kneaded mixture and kneaded, followed by vulcanization. In this way, for example, the rubber composition can be prepared.

The rubber composition of the present invention can be used for various tire components, and suitably for treads.

The pneumatic tire of the present invention can be produced from the rubber composition by usual methods.

Specifically, the pneumatic tire may be produced as follows: an unvulcanized rubber composition containing various additives as appropriate is extruded into the shape of a tread of a tire; the extrudate is formed together with other tire components on a tire building machine to build an unvulcanized tire; and the unvulcanized tire is heated and pressurized in a vulcanizer.

The pneumatic tire of the present invention is suitable for passenger vehicles, large passenger vehicles, large SUVs, heavy load vehicles such as trucks and buses, and light trucks. The pneumatic tire can be used as any of the summer tires or studless winter tires for these vehicles.

EXAMPLES

The present invention is more specifically described with reference to non-limiting examples.

<Preparation of Chain End Modifier>

A 100-mL measuring flask was charged with 23.6 g of 3-(N,N-dimethylamino)propyltrimethoxysilane available from AZmax. Co. in a nitrogen atmosphere, and was further charged with anhydrous hexane available from Kanto Chemical Co., Inc. to thereby prepare 100 mL of a chain end modifier.

<Copolymer Preparation 1>

A sufficiently nitrogen-purged, 30-L pressure-resistant vessel was charged with 18 L of n-hexane, 740 g of styrene available from Kanto Chemical Co., Inc., 1260 g of butadiene, and 10 mmol of tetramethylethylenediamine, and then the temperature was raised to 40° C. Next, 10 mL of butyllithium was added to the mixture, and then the temperature was raised to 50° C., followed by stirring for three hours. Subsequently, 11 mL of the chain end modifier was added to the resulting mixture, followed by stirring for 30 minutes. After 15 mL of methanol and 0.1 g of 2,6-tert-butyl-p-cresol were added to the reaction mixture, the reaction mixture was put in a stainless steel vessel containing 18 L of methanol and then aggregates were collected. The aggregates were dried under reduced pressure for 24 hours to give a modified SBR. The modified SBR had a Mw of 270,000, a vinyl content of 56%, and a styrene content of 37% by mass.

The Mw, vinyl content, and styrene content of the modified SBR were analyzed by the methods described below.

<Measurement of Weight Average Molecular Weight (Mw)>

The weight average molecular weight (Mw) of the modified SBR was measured using a gel permeation chromatograph (GPC) (GPC-8000 series available from Tosoh Corporation, detector: differential refractometer, column: TSKGEL SUPERMALTPORE HZ-M available from Tosoh Corporation) and calibrated with polystyrene standards.

<Measurement of Vinyl Content and Styrene Content>

The structure of the modified SBR was identified using a device of JNM-ECA series available from JEOL Ltd. The vinyl content and the styrene content in the modified SBR were calculated from the results.

The chemicals used in the examples and comparative examples are listed below.

NR: TSR20

BR: CB25 (high-cis BR synthesized with Nd catalyst, Tg: −110° C.) available from LANXESS SBR: modified SBR prepared in Copolymer Preparation 1

Carbon black 1: HP160 ($N_2SA$: 165 $m^2/g$) available from Columbia Carbon

Carbon black 2: SHOBLACK N220 ($N_2SA$: 111 $m^2/g$) available from Cabot Japan K.K.

Silica: ULTRASIL VN3 ($N_2SA$: 175 $m^2/g$) available from Evonik

Silica rod: PANGEL (average particle size: 2 μm, $N_2SA$: 320 $m^2/g$) available from TOLSA Diatomite: CelTix (average particle size: 1.5 μm, $N_2SA$: 27 $m^2/g$) available from IMERYS Aluminum hydroxide 1: dry ground product of ATH #B (average particle size: 0.21 μm, $N_2SA$: 55 $m^2/g$, Mohs hardness: 3, Mohs hardness of thermal decomposition product (alumina): 9, thermal decomposition onset temperature: 200° C., solubility at 25° C.: substantially insoluble)

Aluminum hydroxide 2: dry ground product of ATH #B (average particle size: 0.25 μm, $N_2SA$: 45 $m^2/g$, Mohs hardness: 3, Mohs hardness of thermal decomposition product (alumina): 9, thermal decomposition onset temperature: 200° C., solubility at 25° C.: substantially insoluble)

Aluminum hydroxide 3: dry ground product of ATH #B (average particle size: 0.4 μm, $N_2SA$: 34 $m^2/g$, Mohs hardness: 3, Mohs hardness of thermal decomposition product (alumina): 9, thermal decomposition onset temperature: 200° C., solubility at 25° C.: substantially insoluble)

Aluminum hydroxide 4: ATH #B (average particle size: 0.6 μm, $N_2SA$: 15 $m^2/g$, Mohs hardness: 3, Mohs hardness of thermal decomposition product (alumina): 9, thermal decomposition onset temperature: 200° C., solubility at 25° C.: substantially insoluble) available from Sumitomo Chemical Co., Ltd.

Aluminum hydroxide 5: ATH #C (average particle size: 0.8 μm, $N_2SA$: 7.0 $m^2/g$, Mohs hardness: 3, Mohs hardness of thermal decomposition product (alumina): 9, thermal decomposition onset temperature: 200° C., solubility at 25° C.: substantially insoluble) available from Sumitomo Chemical Co., Ltd.

Aluminum hydroxide 6: HIGILITE H-43 (average particle size: 0.75 μm, $N_2SA$: 6.7 $m^2/g$, Mohs hardness: 3, Mohs hardness of thermal decomposition product (alumina): 9, thermal decomposition onset temperature: 200° C., solubility at 25° C.: substantially insoluble) available from Showa Denko K.K.

Aluminum hydroxide 7: C-301N (average particle size: 1.0 μm, $N_2SA$: 4.0 $m^2/g$, Mohs hardness: 3, Mohs hardness of thermal decomposition product (alumina): 9, thermal decomposition onset temperature: 200° C., solubility at 25° C.: substantially insoluble) available from Sumitomo Chemical Co., Ltd.

Aluminum hydroxide 8: prepared by fractionation of ATH #C by membrane filtering method (average particle size: 0.67 μm, $N_2SA$: 47 $m^2/g$, Mohs hardness: 3, Mohs hardness of thermal decomposition product (alumina): 9, thermal decomposition onset temperature: 200° C., solubility at 25° C.: substantially insoluble)

Aluminum hydroxide 9: prepared by fractionation of ATH #C by membrane filtering method (average particle size: 0.15 μm, $N_2SA$: 17 $m^2/g$, Mohs hardness: 3, Mohs hardness of thermal decomposition product (alumina): 9, thermal decomposition onset temperature: 200° C., solubility at 25° C.: substantially insoluble)

Alumina 1: 60P1 (average particle size: 0.03 μm, $N_2SA$: 61 $m^2/g$, Mohs hardness: 9) available from Sumitomo Chemical Co., Ltd.

Alumina 2: 130P1 (average particle size: 0.06 μm, $N_2SA$: 150 $m^2/g$, Mohs hardness: 9) available from Sumitomo Chemical Co., Ltd.

Zirconium: TZ-3YS (average particle size: 0.7 μm, $N_2SA$: 7 $m^2/g$, Mohs hardness: 9) available from Tosoh Corporation Zirconium oxide 1: zirconium oxide SPZ (average particle size: 2.0 μm, $N_2SA$: 4 $m^2/g$, Mohs hardness: 7, solubility at 25° C.: insoluble) available from Daiichi Kigenso Kagaku Kogyo Co., Ltd.

Zirconium oxide 2: zirconium oxide TMZ (average particle size: 1.1 μm, $N_2SA$: 5 $m^2/g$, Mohs hardness: 7, solubility at 25° C.: insoluble) available from Daiichi Kigenso Kagaku Kogyo Co., Ltd.

Zirconium oxide 3: UEP-100 (average particle size: 0.28 μm, $N_2SA$: 50 $m^2/g$, Mohs hardness: 7, solubility at 25° C.: insoluble) available from Daiichi Kigenso Kagaku Kogyo Co., Ltd.

Zirconium oxide 4: zirconium oxide UEP (average particle size: 0.55 μm, $N_2SA$: 25 $m^2/g$, Mohs hardness: 7, solubility at 25° C.: insoluble) available from Daiichi Kigenso Kagaku Kogyo Co., Ltd.

Calcium carbonate 1: Tankaru 200 (average particle size: 2.7 μm, $N_2SA$: 1.1 $m^2/g$) available from Takehara Kagaku Kogyo Co., Ltd.

Calcium carbonate 2: Polcarb (average particle size: 0.95 μm, $N_2SA$: 8.4 $m^2/g$) available from IMERYS Eggshell powder 1: eggshell powder (average particle size: 10 μm, $N_2SA$: 0.2 $m^2/g$) available from Kewpie Corporation Eggshell powder 2: eggshell powder (average particle size: 50 μm, $N_2SA$: 0.1 $m^2/g$) available from Kewpie Corporation Hard clay: Hydrite 121-S (average particle size: 1.5 μm, $N_2SA$: 8 $m^2/g$) available from IMERYS Acicular zinc oxide: zinc oxide single crystal Pana-Tetra (average particle size: 20 μm, $N_2SA$: 0.15 $m^2/g$) available from Amtec Magnesium hydroxide: magnesium hydroxide 0.6 μm (average particle size: 0.6 μm, $N_2SA$: 14 $m^2/g$, Mohs hardness: 2.5, solubility at 25° C.: 1.2 mg, thermal decomposition onset temperature: 350° C.) available from Wako Pure Chemical Industries, Ltd.

Sodium sulfate: sodium sulfate, 1st grade (dry ground product) (average particle size: 0.6 μm, $N_2SA$: 15 $m^2/g$, Mohs hardness: 2.0, solubility at 25° C.: 20 mg, no thermal decomposition onset temperature, melting point: 884° C.) available from Wako Pure Chemical Industries, Ltd.

Zinc oxide: Ginrei R (average particle size: 0.29 μm, $N_2SA$: 4 $m^2/g$) available from Toho Zinc Co., Ltd.

Resin 1 (Grip resin 1): SYLVARES SA85 (copolymer of α-methylstyrene and styrene, softening point: 85° C., Mw: 1000) available from Arizona chemical Resin 2 (Grip resin 2): SYLVARES TP115 (terpene phenol resin, softening point: 115° C.) available from Arizona chemical Resin 3 (Grip resin 3): NOVARES C10 (liquid coumarone indene resin, softening point: 10° C.) available from Rutgers Chemicals Oil 1: Diana Process PA-32 (mineral oil) available from JX Nippon Oil & Energy Corporation Oil 2: Vivatec 500 (TDAE) available from H&R Wax: Ozoace 0355 available from Nippon Seiro Co., Ltd.

Antioxidant 1: Antigene 6C (N-(1,3-dimethylbutyl)-N'-phenyl-p-phenylenediamine) available from Sumitomo Chemical Co., Ltd.

Antioxidant 2: Nocrac 224 (2,2,4-trimethyl-1,2-dihydroquinoline polymer) available from Ouchi Shinko Chemical Industrial Co., Ltd.

Stearic acid: stearic acid "Tsubaki" available from NOF CORPORATION

Processing aid: WB16 (mixture of fatty acid metal salt (fatty acid calcium salt) and fatty acid amide) available from STRUKTOL Silane coupling agent 1: Si75 available from Evonik Silane coupling agent 2: NXT (silane coupling agent represented by the above Formula (I) wherein p=2, q=3, and k=7) available from Momentive Performance Materials Sulfur: HK-200-5 (powdered sulfur containing 5% by mass of oil) available from Hosoi Chemical Industry Co., Ltd.

Vulcanization accelerator 1: Nocceler NS-G (N-tert-butyl-2-benzothiazolylsulfenamide) available from Ouchi Shinko Chemical Industrial Co., Ltd.

Vulcanization accelerator 2: Nocceler D (1,3-diphenylguanidine) available from Ouchi Shinko Chemical Industrial Co., Ltd.

Examples and Comparative Examples

According to the formulations for summer tires in Table 1 and for studless winter tires in Table 2, the whole amounts of the rubber component and carbon black, and the silica and silane coupling agent were kneaded at 150° C. for five minutes using a Banbury mixer. The resulting mixture was kneaded with the other materials excluding the sulfur and vulcanization accelerators at 150° C. for four minutes to give a kneaded mixture (base kneading step). To the kneaded mixture were then added the sulfur and vulcanization accelerators, followed by kneading at 105° C. for four minutes using an open roll mill to prepare an unvulcanized rubber composition (final kneading step).

The unvulcanized rubber composition was press-vulcanized at 170° C. for 12 minutes to prepare a vulcanized rubber composition.

Separately, the unvulcanized rubber composition was shaped as a tread and assembled with other tire components on a tire building machine. The assembly was press-vulcanized at 170° C. for 12 minutes to prepare a test tire (tire size: 245/40R18).

The thus-prepared vulcanized rubber compositions and test tires were evaluated as follows. Tables 1 and 2 show the evaluation results.

(Wet Grip Performance)

The test tires were mounted on a front-engine, rear-wheel-drive car with a displacement of 2000 cc made in Japan. A test driver drove the car 10 laps around a test track with a wet asphalt surface, and then evaluated the control stability during steering. The results are expressed as an index, with the value in Comparative Example 1 or 22 set equal to 100. A higher index indicates higher wet grip performance. Tires with an index of 104 or higher have good wet grip performance.

(Abrasion Resistance)

The test tires were mounted on a front-engine, rear-wheel-drive car with a displacement of 2000 cc made in Japan. A test driver drove the car in a test track with a dry asphalt surface. Then, the remaining groove depth in the tire tread rubber (initial depth: 8.0 mm) was measured to evaluate abrasion resistance. The larger the remaining groove depth is, the higher the abrasion resistance is. The remaining groove depths are expressed as an index, with the value in Comparative Example 1 or 22 set equal to 100. A higher index indicates higher abrasion resistance. Tires with an index of 85 or higher have good abrasion resistance.

(Roll Processability Index)

During the kneading step using an open roll mill, the winding of the unvulcanized rubber composition around the roll and the like were visually checked and expressed as an index (roll processability index), with the value in Comparative Example 1 or 22 set equal to 100. A higher index indicates better processability with smooth warming, kneading, and sheeting operations in the open roll mill. Rubber compositions with an index of 90 or higher have good roll processability.

TABLE 1

| | | Av. particle Size (μm) 0.69 μm ≥ | N₂SA (m²/g) 10-50 m²/g | Com. Ex. 1 | Com. Ex. 2 | Ex. 1 | Ex. 2 | Ex. 3 | Ex. 3 | Ex. 4 | Ex. 5 | Com. Ex. 6 | Com. Ex. 7 | Com. Ex. 8 | Com. Ex. 9 | Com. Ex. 10 |
|---|---|---|---|---|---|---|---|---|---|---|---|---|---|---|---|---|
| Summer tire | | | | | | | | | | | | | | | | |
| Formulation (parts by mass) | Base kneading step | | | | | | | | | | | | | | | |
| | NR | — | — | — | — | — | — | — | — | — | — | — | — | — | — | — |
| | BR | — | — | 30 | 30 | 30 | 30 | 30 | 30 | 30 | 30 | 30 | 30 | 30 | 30 | 30 |
| | SBR | — | — | 70 | 70 | 70 | 70 | 70 | 70 | 70 | 70 | 70 | 70 | 70 | 70 | 70 |
| | Carbon black 1 | — | 165 | 5 | 5 | 5 | 5 | 5 | 5 | 5 | 5 | 5 | 5 | 5 | 5 | 5 |
| | Carbon black 2 | — | 111 | — | — | — | — | — | — | — | — | — | — | — | — | — |
| | Silica | — | 175 | 90 | 88 | 90 | 90 | 90 | 90 | 90 | 90 | 88 | 90 | 90 | 90 | 90 |
| | Silica rod | 2 | 320 | — | — | — | — | — | — | — | — | — | — | — | — | — |
| | Diatomite | 1.5 | 27 | — | — | — | — | — | — | — | — | — | — | — | — | — |
| | Aluminum hydroxide 1 | 0.21 | 55 | — | 10 | — | — | — | — | — | — | — | — | — | — | — |
| | Aluminum hydroxide 2 | 0.25 | 45 | — | — | 10 | — | — | — | — | — | — | — | — | — | — |
| | Aluminum hydroxide 3 | 0.4 | 34 | — | — | — | 10 | — | — | — | — | — | — | — | — | — |
| | Aluminum hydroxide 4 | 0.6 | 15 | — | — | — | — | 10 | — | — | — | — | — | — | — | — |
| | Aluminum hydroxide 5 | 0.8 | 7.0 | — | — | — | — | — | — | 10 | — | — | — | — | — | — |
| | Aluminum hydroxide 6 | 0.75 | 6.7 | — | — | — | — | — | 10 | — | — | — | — | — | — | — |
| | Aluminum hydroxide 7 | 1.0 | 4.0 | — | — | — | — | — | — | — | 10 | — | — | — | — | — |
| | Aluminum hydroxide 8 | 0.67 | 47 | — | — | — | — | — | — | — | — | — | — | — | — | — |
| | Aluminum hydroxide 9 | 0.15 | 17 | — | — | — | — | — | — | — | — | — | — | — | — | — |
| | Alumina 1 | 0.03 | 61 | — | — | — | — | — | — | — | — | 10 | — | — | — | — |
| | Alumina 2 | 0.06 | 150 | — | — | — | — | — | — | — | — | — | — | — | — | — |
| | Zirconium | 0.7 | 7 | — | — | — | — | — | — | — | — | — | — | — | — | — |
| | Zirconium oxide 1 | 2.0 | 4 | — | — | — | — | — | — | — | — | — | 10 | 10 | 10 | 10 |
| | Zirconium oxide 2 | 1.1 | 5 | — | — | — | — | — | — | — | — | — | — | — | — | — |
| | Zirconium oxide 3 | 0.28 | 50 | — | — | — | — | — | — | — | — | — | — | — | — | — |
| | Zirconium oxide 4 | 0.55 | 25 | — | — | — | — | — | — | — | — | — | — | — | — | — |
| | Calcium carbonate 1 | 2.7 | 1.1 | — | — | — | — | — | — | — | — | — | — | — | — | — |
| | Calcium carbonate 2 | 0.95 | 8.4 | — | — | — | — | — | — | — | — | — | — | — | — | — |
| | Eggshell powder 1 | 10 | 0.2 | — | — | — | — | — | — | — | — | — | — | — | — | — |
| | Eggshell powder 2 | 50 | 0.1 | — | — | — | — | — | — | — | — | — | — | — | — | — |
| | Hard clay | 1.5 | 8 | — | — | — | — | — | — | — | — | — | — | — | — | — |
| | Acicular zinc oxide | 20 | 0.15 | — | — | — | — | — | — | — | — | — | — | — | — | — |
| | Magnesium hydroxide | 0.6 | 14 | — | — | — | — | — | — | — | — | — | — | — | — | — |
| | Sodium sulfate | 0.6 | 15 | — | — | — | — | — | — | — | — | — | — | — | — | — |
| | Zinc oxide | 0.29 | 4 | 2.5 | 2.5 | 2.5 | 2.5 | 2.5 | 2.5 | 2.5 | 2.5 | 2.5 | 2.5 | 2.5 | 2.5 | 2.5 |
| | Grip resin 1 | — | — | 10 | 10 | 10 | 10 | 10 | 10 | 10 | 10 | 10 | 10 | 10 | 10 | 10 |
| | Grip resin 2 | — | — | — | — | — | — | — | — | — | — | — | — | — | — | — |
| | Grip resin 3 | — | — | — | — | — | — | — | — | — | — | — | — | — | — | — |
| | Oil 1 | — | — | 10 | 10 | 10 | 10 | 10 | 10 | 10 | 10 | 10 | 10 | 10 | 10 | 10 |
| | Oil 2 | — | — | — | — | — | — | — | — | — | — | — | — | — | — | — |
| | Wax | — | — | 1.5 | 1.5 | 1.5 | 1.5 | 1.5 | 1.5 | 1.5 | 1.5 | 1.5 | 1.5 | 1.5 | 1.5 | 1.5 |
| | Antioxidant 1 | — | — | 2.5 | 2.5 | 2.5 | 2.5 | 2.5 | 2.5 | 2.5 | 2.5 | 2.5 | 2.5 | 2.5 | 2.5 | 2.5 |
| | Antioxidant 2 | — | — | 1 | 1 | 1 | 1 | 1 | 1 | 1 | 1 | 1 | 1 | 1 | 1 | 1 |

TABLE 1-continued

| | | | Ex. | | | | | Com. Ex. | | | | | Ex. | | |
|---|---|---|---|---|---|---|---|---|---|---|---|---|---|---|---|
| | | 4 | 5 | 11 | 12 | 13 | 14 | 15 | 16 | 17 | 18 | 6 | 7 | 8 |
| Final kneading step | Stearic acid | 3 | 3 | 3 | 3 | 3 | 3 | 3 | 3 | 3 | 3 | 3 | 3 | 3 |
| | Processing aid | — | 3 | 3 | — | — | — | — | — | — | — | — | — | — |
| | Silane coupling agent 1 | — | — | 7.2 | 7.2 | 7.2 | 7.2 | 7.2 | 7.2 | 7.2 | 7.2 | 7.2 | 7.2 | 7.2 |
| | Silane coupling agent 2 | 7.2 | 7.2 | — | — | — | — | — | — | — | — | — | — | — |
| | Sulfur | 1.50 | 1.50 | 1.50 | 1 | 1.50 | 1.50 | 1.50 | 1.50 | 1.50 | 1.50 | 1.50 | 1.50 | 1.50 |
| | Vulcanization accelerator 1 | 1.7 | 1.7 | 1.7 | 1.7 | 1.7 | 1.7 | 1.7 | 1.7 | 1.7 | 1.7 | 1.7 | 1.7 | 1.7 |
| | Vulcanization accelerator 2 | — | — | 2 | 2 | 2 | 2 | 2 | 2 | 2 | 2 | 2 | 2 | 2 |
| Evaluation | Wet grip performance index (Target ≥ 104) | 100 | 151 | 150 | 147 | 145 | 125 | 125 | 115 | 106 | 105 | 127 | 122 | 124 |
| | Abrasion resistance index (Target ≥ 85) | 100 | 83 | 97 | 102 | 90 | 80 | 84 | 84 | 83 | 80 | 83 | 83 | 80 |
| | Roll processability index (Target ≥ 90) | 100 | 80 | 95 | 100 | 100 | 100 | 100 | 100 | 100 | 100 | 100 | 100 | 100 |

| | | Av. particle size (µm) | N₂SA (m²/g) | 0.69 µm ≥ | 10–50 m²/g | 4 | 5 | 11 | 12 | 13 | 14 | 15 | 16 | 17 | 18 | 6 | 7 | 8 |
|---|---|---|---|---|---|---|---|---|---|---|---|---|---|---|---|---|---|---|
| Summer tire | | | | | | | | | | | | | | | | | | |
| Formulation (parts by mass) Base kneading step | NR | — | — | — | — | 30 | 30 | 30 | 30 | 30 | 30 | 30 | 30 | 30 | 30 | 30 | 30 | 30 |
| | BR | — | — | — | — | 70 | 70 | 70 | 70 | 70 | 70 | 70 | 70 | 70 | 70 | 70 | 70 | 70 |
| | SBR | — | — | — | — | 5 | 5 | 5 | 5 | 5 | 5 | 5 | 5 | 5 | 5 | 5 | 5 | 5 |
| | Carbon black 1 | — | 165 | | | 90 | 90 | 90 | 90 | 90 | 90 | 80 | 90 | 90 | 90 | 90 | 90 | 90 |
| | Carbon black 2 | — | 111 | | | — | — | — | — | — | — | — | — | — | — | — | — | — |
| | Silica | — | 175 | | | — | — | — | — | — | — | 10 | — | — | — | — | — | — |
| | Silica rod | 2 | 320 | | | 10 | — | — | — | — | — | — | — | — | — | — | — | — |
| | Diatomite | 1.5 | 27 | | | — | — | — | — | — | — | — | — | — | — | — | — | — |
| | Aluminum hydroxide 1 | 0.21 | 55 | | | — | — | — | — | — | — | — | — | — | — | — | — | — |
| | Aluminum hydroxide 2 | 0.25 | 45 | | | — | — | — | — | — | — | — | — | — | — | — | — | — |
| | Aluminum hydroxide 3 | 0.4 | 34 | | | — | 10 | — | — | — | — | — | — | — | — | — | — | — |
| | Aluminum hydroxide 4 | 0.6 | 15 | | | — | — | — | — | — | — | — | — | — | — | — | — | 40 |
| | Aluminum hydroxide 5 | 0.8 | 7.0 | | | — | — | — | — | — | — | — | 10 | — | — | — | — | — |
| | Aluminum hydroxide 6 | 0.75 | 6.7 | | | — | — | — | — | — | — | — | — | — | — | — | — | — |
| | Aluminum hydroxide 7 | 1.0 | 4.0 | | | — | — | — | — | — | — | — | — | — | — | — | — | — |
| | Aluminum hydroxide 8 | 0.67 | 47 | | | — | — | — | — | — | — | — | — | — | — | 3 | — | — |
| | Aluminum hydroxide 9 | 0.15 | 17 | | | — | — | 10 | — | — | — | — | — | — | — | — | — | — |
| | Alumina 1 | 0.03 | 61 | | | — | — | — | — | — | — | — | — | — | — | — | 20 | — |
| | Alumina 2 | 0.06 | 150 | | | — | — | — | — | — | — | — | — | — | — | — | — | — |
| | Zirconium | 0.7 | 7 | | | — | — | — | — | — | — | — | — | — | — | — | — | — |
| | Zirconium oxide 1 | 2.0 | 4 | | | — | — | — | — | — | — | — | — | — | — | — | — | — |
| | Zirconium oxide 2 | 1.1 | 5 | | | — | — | — | — | — | — | — | — | — | — | — | — | — |
| | Zirconium oxide 3 | 0.28 | 50 | | | — | — | — | — | — | — | — | — | — | — | — | — | — |
| | Zirconium oxide 4 | 0.55 | 25 | | | — | — | — | — | — | — | — | — | — | — | — | — | — |
| | Calcium carbonate 1 | 2.7 | 1.1 | | | — | — | — | 10 | — | — | — | — | — | — | — | — | — |
| | Calcium carbonate 2 | 0.95 | 8.4 | | | — | — | — | — | — | — | — | — | — | — | — | — | — |
| | Eggshell powder 1 | 10 | 0.2 | | | — | — | — | — | 10 | — | — | — | — | — | — | — | — |
| | Eggshell powder 2 | 50 | 0.1 | | | — | — | — | — | — | 10 | — | — | — | — | — | — | — |
| | Hard clay | 1.5 | 8 | | | — | — | — | — | — | — | — | — | 10 | — | — | — | — |
| | Acicular zinc oxide | 20 | 0.15 | | | — | — | — | — | — | — | — | — | — | 10 | — | — | — |
| | Magnesium hydroxide | 0.6 | 14 | | | — | — | — | — | — | — | — | — | — | — | — | — | — |
| | Sodium sulfate | 0.6 | 15 | | | — | — | — | — | — | — | — | — | — | — | — | — | — |
| | Zinc oxide | 0.29 | 4 | | | 2.5 | 2.5 | 2.5 | 2.5 | 2.5 | 2.5 | 2.5 | 2.5 | 2.5 | 2.5 | 2.5 | 2.5 | 2.5 |
| | Grip resin 1 | — | — | | | — | — | — | — | — | — | — | — | — | — | — | — | — |
| | Grip resin 2 | — | — | | | — | — | — | — | — | — | — | — | — | — | — | — | — |
| | Grip resin 3 | — | — | | | — | — | — | — | — | — | — | — | — | — | — | — | — |
| | Oil 1 | — | — | | | 10 | 10 | 10 | 10 | 10 | 10 | 10 | 10 | 10 | 10 | 10 | 10 | 10 |

TABLE 1-continued

| | | | | Ex. 9 | Ex. 10 | Ex. 11 | Com. Ex. 19 | Ex. 12 | Com. Ex. 20 | Ex. 13 | Ex. 14 | Ex. 15 | Ex. 16 | Ex. 17 | Com. Ex. 21 | Ex. 18 |
|---|---|---|---|---|---|---|---|---|---|---|---|---|---|---|---|---|
| Final kneading step | | Oil 2 | | 10 | 10 | 10 | 10 | 10 | 10 | 10 | 10 | 10 | 10 | 10 | 10 | 10 |
| | | Wax | | 1.5 | 1.5 | 1.5 | 1.5 | 1.5 | 1.5 | 1.5 | 1.5 | 1.5 | 1.5 | 1.5 | 1.5 | 1.5 |
| | | Antioxidant 1 | | 2.5 | 2.5 | 2.5 | 2.5 | 2.5 | 2.5 | 2.5 | 2.5 | 2.5 | 2.5 | 2.5 | 2.5 | 2.5 |
| | | Antioxidant 2 | | 1 | 1 | 1 | 1 | 1 | 1 | 1 | 1 | 1 | 1 | 1 | 1 | 1 |
| | | Stearic acid | | 3 | 3 | 3 | 3 | 3 | 3 | 3 | 3 | 3 | 3 | 3 | 3 | 3 |
| | | Processing aid | | — | — | — | — | — | — | — | — | — | — | — | — | — |
| | | Silane coupling agent 1 | | 7.2 | 7.2 | 7.2 | 7.2 | 7.2 | 7.2 | 7.2 | 7.2 | 7.2 | 7.2 | 7.2 | 7.2 | 7.2 |
| | | Silane coupling agent 2 | | — | — | — | — | — | — | — | — | — | — | — | — | — |
| | | Sulfur | | 1.50 | 1.50 | 1.50 | 1.50 | 1.50 | 1.50 | 1.50 | 1.50 | 1.50 | 1.50 | 1.50 | 1.50 | 1.50 |
| | | Vulcanization accelerator 1 | | 1.7 | 1.7 | 1.7 | 1.7 | 1.7 | 1.7 | 1.7 | 1.7 | 1.7 | 1.7 | 1.7 | 1.7 | 1.7 |
| | | Vulcanization accelerator 2 | | 2 | 2 | 2 | 2 | 2 | 2 | 2 | 2 | 2 | 2 | 2 | 2 | 2 |
| Evaluation | | Wet grip performance index (Target ≥ 104) | | 133 | 135 | 97 | 96 | 97 | 96 | 90 | 93 | 89 | 97 | 114 | 149 | 151 |
| | | Abrasion resistance index (Target ≥ 85) | | 97 | 94 | 84 | 89 | 79 | 80 | 73 | 73 | 85 | 81 | 97 | 91 | 95 |
| | | Roll processability index (Target ≥ 90) | | 99 | 100 | 115 | 110 | 100 | 100 | 90 | 105 | 70 | 100 | 100 | 95 | 95 |

| | | | Av. particle size (μm) 0.69 μm ≥ | N₂SA (m²/g) 10-50 m²/g | Ex. 9 | Ex. 10 | Ex. 11 | Com. Ex. 19 | Ex. 12 | Com. Ex. 20 | Ex. 13 | Ex. 14 | Ex. 15 | Ex. 16 | Ex. 17 | Com. Ex. 21 | Ex. 18 |
|---|---|---|---|---|---|---|---|---|---|---|---|---|---|---|---|---|---|
| Summer tire | Base kneading step | NR | — | — | 30 | 40 | 50 | 30 | 60 | 60 | 30 | 30 | 30 | 30 | 30 | 30 | 30 |
| Formulation (parts by mass) | | BR | — | — | 70 | 60 | 50 | 70 | 40 | 40 | 70 | 70 | 70 | 70 | 70 | 70 | 70 |
| | | SBR | — | — | 5 | 5 | 5 | 5 | 5 | 5 | 5 | 5 | 5 | 5 | 5 | 5 | 5 |
| | | Carbon black 1 | — | 165 | 90 | 90 | 90 | 90 | 90 | 80 | 90 | 90 | 90 | 90 | 90 | 90 | 90 |
| | | Carbon black 2 | — | 111 | — | — | — | — | — | — | — | — | — | — | — | — | — |
| | | Silica | — | 175 | — | — | — | — | — | — | — | — | — | — | — | — | — |
| | | Silica rod | 2 | 27 | 3 | — | — | — | — | — | — | — | — | — | — | — | — |
| | | Diatomite | 1.5 | 320 | — | 20 | 40 | 0.5 | 55 | 65 | — | — | — | — | — | — | — |
| | | Aluminum hydroxide 1 | 0.21 | 55 | — | — | — | — | — | — | — | — | — | — | — | — | — |
| | | Aluminum hydroxide 2 | 0.25 | 45 | — | — | — | — | — | — | — | — | — | — | — | — | — |
| | | Aluminum hydroxide 3 | 0.4 | 34 | — | — | — | — | — | — | — | — | — | — | — | — | — |
| | | Aluminum hydroxide 4 | 0.6 | 15 | — | — | — | — | — | — | — | — | — | — | — | — | 10 |
| | | Aluminum hydroxide 5 | 0.8 | 7.0 | — | — | — | — | — | — | — | 10 | — | — | — | — | — |
| | | Aluminum hydroxide 6 | 0.75 | 6.7 | — | — | — | — | — | — | 10 | — | — | — | — | — | — |
| | | Aluminum hydroxide 7 | 1.0 | 4.0 | — | — | — | — | — | — | — | — | — | — | — | — | — |
| | | Aluminum hydroxide 8 | 0.67 | 47 | — | — | — | — | — | — | — | — | 10 | — | — | — | — |
| | | Aluminum hydroxide 9 | 0.15 | 17 | — | — | — | — | — | — | — | — | — | 10 | — | — | — |
| | | Alumina 1 | 0.03 | 61 | — | — | — | — | — | — | — | — | — | — | — | — | — |
| | | Alumina 2 | 0.06 | 150 | — | — | — | — | — | — | — | — | — | — | — | — | — |
| | | Zirconium | 0.7 | 7 | — | — | — | — | — | — | — | — | — | — | — | — | — |
| | | Zirconium oxide 1 | 2.0 | 4 | — | — | — | — | — | — | — | — | — | — | — | — | — |
| | | Zirconium oxide 2 | 1.1 | 5 | — | — | — | — | — | — | — | — | — | — | — | — | — |
| | | Zirconium oxide 3 | 0.28 | 50 | — | — | — | — | — | — | — | — | — | — | 10 | — | — |
| | | Zirconium oxide 4 | 0.55 | 25 | — | — | — | — | — | — | — | — | — | — | — | — | — |
| | | Calcium carbonate 1 | 2.7 | 1.1 | — | — | — | — | — | — | — | — | — | — | — | — | — |
| | | Calcium carbonate 2 | 0.95 | 8.4 | — | — | — | — | — | — | — | — | — | — | — | — | — |
| | | Eggshell powder 1 | 10 | 0.2 | — | — | — | — | — | — | — | — | — | — | — | — | — |
| | | Eggshell powder 2 | 50 | 0.1 | — | — | — | — | — | — | — | — | — | — | — | — | — |
| | | Hard clay | 1.5 | 8 | — | — | — | — | — | — | — | — | — | — | — | — | — |
| | | Acicular zinc oxide | 20 | 0.15 | — | — | — | — | — | — | — | — | — | — | — | — | — |
| | | Magnesium hydroxide | 0.6 | 14 | — | — | — | — | — | — | — | — | — | — | — | 10 | — |
| | | Sodium sulfate | 0.6 | 15 | — | — | — | — | — | — | — | — | — | — | — | — | — |
| | | Zinc oxide | 0.29 | 4 | 2.5 | 2.5 | 2.5 | 2.5 | 2.5 | 2.5 | 2.5 | 2.5 | 2.5 | 2.5 | 2.5 | 2.5 | 2.5 |

TABLE 1-continued

|  |  | 1 | 2 | 3 | 4 | 5 | 6 | 7 | 8 | 9 | 10 | 11 | 12 | 13 |
|---|---|---|---|---|---|---|---|---|---|---|---|---|---|---|
|  | Grip resin 1 | 10 | 10 | 10 | 10 | 0 | 0 | 10 | 10 | 10 | — | — | 10 | 10 |
|  | Grip resin 2 | — | — | — | — | — | — | — | — | — | 10 | 10 | — | — |
|  | Grip resin 3 | — | — | — | — | — | — | — | — | — | — | — | — | — |
|  | Oil 1 | — | — | — | — | 20 | 20 | — | — | — | — | — | — | — |
|  | Oil 2 | 10 | 10 | 10 | 10 | — | — | 10 | 10 | 10 | 10 | 10 | 10 | 10 |
|  | Wax | 1.5 | 1.5 | 1.5 | 1.5 | 1.5 | 1.5 | 1.5 | 1.5 | 1.5 | 1.5 | 1.5 | 1.5 | 1.5 |
|  | Antioxidant 1 | 2.5 | 2.5 | 2.5 | 2.5 | 2.5 | 2.5 | 2.5 | 2.5 | 2.5 | 2.5 | 2.5 | 2.5 | 2.5 |
|  | Antioxidant 2 | 1 | 1 | 1 | 1 | 1 | 1 | 1 | 1 | 1 | 1 | 1 | 1 | 1 |
|  | Stearic acid | 3 | 3 | 3 | 3 | 3 | 3 | 3 | 3 | 3 | 3 | 3 | 3 | 3 |
|  | Processing aid | — | 1.5 | — | — | 3 | 3 | — | — | — | — | — | — | — |
|  | Silane coupling agent 1 | 7.2 | 7.2 | 7.2 | — | 7.2 | — | 7.2 | 7.2 | — | 7.2 | 7.2 | 7.2 | 7.2 |
|  | Silane coupling agent 2 | — | — | — | — | — | 6.4 | — | — | 5.4 | — | — | — | — |
| Final kneading step | Sulfur | 1.50 | 1.50 | 1.50 | 1.50 | 1.50 | 1.50 | 1.50 | 1.50 | 1.50 | 1.50 | 1.50 | 1.50 | 1.50 |
|  | Vulcanization accelerator 1 | 1.7 | 1.7 | 1.7 | 1.7 | 1.7 | 2 | 1.7 | 1.7 | 1.7 | 1.7 | 1.7 | 1.7 | 1.7 |
|  | Vulcanization accelerator 2 | 2 | 2 | 2 | 2 | 2 | 2 | 2 | 2 | 2 | 2 | 2 | 2 | 2 |
| Evaluation | Wet grip performance index (Target ≥ 104) | 115 | 151 | 155 | 101 | 155 | 150 | 145 | 147 | 143 | 142 | 148 | 95 | 115 |
|  | Abrasion resistance index (Target ≥ 85) | 98 | 89 | 88 | 99 | 95 | 80 | 90 | 95 | 105 | 98 | 92 | 81 | 86 |
|  | Roll processability index (Target ≥ 90) | 95 | 90 | 90 | 100 | 90 | 80 | 93 | 95 | 110 | 100 | 100 | 102 | 100 |

TABLE 2

| Studless winter tire | | Av. particle size (μm) ≥0.69 μm | N₂SA (m²/g) 10-50 m²/g | Com. Ex. 22 | Com. Ex. 23 | Ex. 19 | Ex. 20 | Ex. 21 | Ex. 24 | Ex. 25 | Com. Ex. 26 | Com. Ex. 27 | Com. Ex. 28 | Com. Ex. 29 | Com. Ex. 30 | Ex. 22 | Ex. 23 | Com. Ex. 31 |
|---|---|---|---|---|---|---|---|---|---|---|---|---|---|---|---|---|---|---|
| Formulation (parts by mass) | Base kneading step | | | | | | | | | | | | | | | | | |
| | NR | — | — | 40 | 40 | 40 | 40 | 40 | 40 | 40 | 40 | 40 | 40 | 40 | 40 | 40 | 40 | 40 |
| | BR | — | — | 60 | 60 | 60 | 60 | 60 | 60 | 60 | 60 | 60 | 60 | 60 | 60 | 60 | 60 | 60 |
| | SBR | — | — | — | — | — | — | — | — | — | — | — | — | — | — | — | — | — |
| | Carbon black 1 | — | 165 | 5 | 5 | 5 | 5 | 5 | 5 | 5 | 5 | 5 | 5 | 5 | 5 | 5 | 5 | 5 |
| | Carbon black 2 | — | 111 | — | — | — | — | — | — | — | — | — | — | — | — | — | — | — |
| | Silica | — | 175 | 60 | 60 | 60 | 60 | 60 | 60 | 60 | 60 | 60 | 60 | 60 | 60 | 60 | 60 | 60 |
| | Silica rod | 2 | 320 | — | — | — | — | — | — | — | — | — | — | — | — | — | — | — |
| | Diatomite | 1.5 | 27 | — | — | — | — | — | — | — | — | — | — | — | — | — | — | — |
| | Aluminum hydroxide 1 | 0.21 | 55 | — | 10 | — | — | — | — | — | — | — | — | — | — | — | — | — |
| | Aluminum hydroxide 2 | 0.25 | 45 | — | — | 10 | — | — | — | — | — | — | — | — | — | — | — | — |
| | Aluminum hydroxide 3 | 0.4 | 34 | — | — | — | 10 | — | — | — | — | — | — | — | — | — | — | — |
| | Aluminum hydroxide 4 | 0.6 | 15 | — | — | — | — | 10 | — | — | — | — | — | — | — | — | — | — |
| | Aluminum hydroxide 5 | 0.8 | 7.0 | — | — | — | — | — | 10 | — | — | — | — | — | — | — | — | — |
| | Aluminum hydroxide 6 | 0.75 | 6.7 | — | — | — | — | — | — | 10 | — | — | — | — | — | — | — | — |
| | Aluminum hydroxide 7 | 1.0 | 4.0 | — | — | — | — | — | — | — | — | — | — | — | — | — | — | — |
| | Alumina 1 | 0.03 | 61 | — | — | — | — | — | — | — | 10 | — | — | — | — | — | — | — |
| | Alumina 2 | 0.06 | 150 | — | — | — | — | — | — | — | — | 10 | — | — | — | — | — | — |
| | Zirconium | 0.7 | 7 | — | — | — | — | — | — | — | — | — | 10 | — | — | — | — | — |
| | Zirconium oxide 1 | 2.0 | 4 | — | — | — | — | — | — | — | — | — | — | 10 | — | — | — | — |
| | Zirconium oxide 2 | 1.1 | 5 | — | — | — | — | — | — | — | — | — | — | — | 10 | — | — | — |
| | Zirconium oxide 3 | 0.28 | 50 | — | — | — | — | — | — | — | — | — | — | — | — | 10 | — | — |
| | Zirconium oxide 4 | 0.55 | 25 | — | — | — | — | — | — | — | — | — | — | — | — | — | 10 | — |
| | Calcium carbonate 1 | 2.7 | 1.1 | — | — | — | — | — | — | — | — | — | — | — | — | — | — | 10 |
| | Calcium carbonate 2 | 0.95 | 8.4 | — | — | — | — | — | — | — | — | — | — | — | — | — | — | — |
| | Eggshell powder 1 | 10 | 0.2 | — | — | — | — | — | — | — | — | — | — | — | — | — | — | — |
| | Eggshell powder 2 | 50 | 0.1 | — | — | — | — | — | — | — | — | — | — | — | — | — | — | — |
| | Hard clay | 1.5 | 8 | — | — | — | — | — | — | — | — | — | — | — | — | — | — | — |
| | Acicular zinc oxide | 20 | 0.15 | — | — | — | — | — | — | — | — | — | — | — | — | — | — | — |
| | Grip resin 1 | — | — | — | — | — | — | — | — | — | — | — | — | — | — | — | — | — |
| | Zinc oxide | — | — | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Oil 1 | — | — | 8 | 8 | 8 | 8 | 8 | 8 | 8 | 8 | 8 | 8 | 8 | 8 | 8 | 8 | 8 |
| | Oil 2 | — | — | 10 | 10 | 10 | 10 | 10 | 10 | 10 | 10 | 10 | 10 | 10 | 10 | 10 | 10 | 10 |
| | Wax | — | — | 10 | 10 | 10 | 10 | 10 | 10 | 10 | 10 | 10 | 10 | 10 | 10 | 10 | 10 | 10 |
| | Antioxidant 1 | — | — | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Antioxidant 2 | — | — | 2 | 2 | 2 | 2 | 2 | 2 | 2 | 2 | 2 | 2 | 2 | 2 | 2 | 2 | 2 |
| | Stearic acid | — | — | 1 | 1 | 1 | 1 | 1 | 1 | 1 | 1 | 1 | 1 | 1 | 1 | 1 | 1 | 1 |
| | Processing aid | — | — | 1 | 1 | 1 | 1 | 1 | 1 | 1 | 1 | 1 | 1 | 1 | 1 | 1 | 1 | 1 |
| | Silane coupling agent 1 | — | — | 3 | 3 | 3 | 3 | 3 | 3 | 3 | 3 | 3 | 3 | 3 | 3 | 3 | 3 | 3 |
| Final Kneading step | Sulfur | — | — | 4.8 | 4.8 | 4.8 | 4.8 | 4.8 | 4.8 | 4.8 | 4.8 | 4.8 | 4.8 | 4.8 | 4.8 | 4.8 | 4.8 | 4.8 |
| | Vulcanization accelerator 1 | — | — | 0.70 | 0.70 | 0.70 | 0.70 | 0.70 | 0.70 | 0.70 | 0.70 | 0.70 | 0.70 | 0.70 | 0.70 | 0.70 | 0.70 | 0.70 |
| | Vulcanization accelerator 2 | — | — | 2 | 2 | 2 | 2 | 2 | 2 | 2 | 2 | 2 | 2 | 2 | 2 | 2 | 2 | 2 |
| Evaluation | Wet grip performance index (Target ≥104) | | | 100 | 131 | 130 | 133 | 129 | 115 | 112 | 104 | 102 | 126 | 121 | 122 | 110 | 114 | 91 |
| | Abrasion resistance index (Target ≥85) | | | 100 | 88 | 98 | 104 | 92 | 83 | 83 | 84 | 80 | 83 | 80 | 78 | 90 | 90 | 81 |
| | Roll processability index (Target ≥90) | | | 100 | 80 | 90 | 90 | 96 | 97 | 96 | 97 | 90 | 100 | 100 | 100 | 94 | 96 | 100 |

The evaluation results of Tables 1 and 2 demonstrate that in examples containing an inorganic reinforcing agent represented by a specific formula and having a predetermined average particle size and a certain nitrogen adsorption specific surface area, wet grip performance was improved while maintaining good abrasion resistance and good roll processability, and therefore a balanced improvement in these properties was achieved. In particular, the use of aluminum hydroxide markedly improved the balance of the properties.

The invention claimed is:

1. A pneumatic tire other than a studless winter tire, comprising a tread formed from a rubber composition for tires, comprising, per 100 parts by mass of a rubber component,
   2 to 50 parts by mass of at least one of aluminum hydroxide or zirconium oxide each having an average particle size of 0.69 μm or less and a nitrogen adsorption specific surface area of 10 to 50 $m^2/g$,
   5 to 25 parts by mass of at least one resin selected from the group consisting of C5 petroleum resins, C9 petroleum resins, terpene-based resins, coumarone indene resins and aromatic vinyl polymers, and
   90 to 130 parts by mass of silica.

2. The pneumatic tire according to claim 1, wherein the at least one of aluminum hydroxide or zirconium oxide has a Mohs hardness of less than 7, and
   a thermal decomposition product of the at least one of aluminum hydroxide or zirconium oxide has a Mohs hardness of 8 or more.

3. The pneumatic tire according to claim 1, wherein the at least one of aluminum hydroxide or zirconium oxide has a solubility in pure water at 25° C. of 5 mg/$cm^3$ or less.

4. The pneumatic tire according to claim 1, wherein the rubber composition comprises a diene rubber in an amount of 30% by mass or more based on 100% by mass of the rubber component, and
   the at least one of aluminum hydroxide or zirconium oxide is aluminum hydroxide.

5. The pneumatic tire according to claim 1, wherein the rubber composition comprises styrene-butadiene rubber in an amount of 10% by mass or more based on 100% by mass of the rubber component.

6. A studless winter tire, comprising a tread formed from a rubber composition for tires, comprising, per 100 parts by mass of a rubber component,
   2 to 50 parts by mass of at least one of aluminum hydroxide or zirconium oxide each having an average particle size of 0.69 μm or less and a nitrogen adsorption specific surface area of 10 to 50 $m^2/g$,
   5 to 25 parts by mass of at least one resin selected from the group consisting of C5 petroleum resins, C9 petroleum resins terpene-based resins, coumarone indene resins and aromatic vinyl polymers, and
   50 to 110 parts by mass of silica.

7. The studless winter tire according to claim 6,
   wherein the rubber composition comprises a diene rubber in an amount of 30% by mass or more based on 100% by mass of the rubber component, and
   the at least one of aluminum hydroxide or zirconium oxide is aluminum hydroxide.

8. The studless winter tire according to claim 6,
   wherein the rubber composition comprises butadiene rubber in an amount of 30% by mass or more based on 100% by mass of the rubber component.

* * * * *